Figures 1, 2:
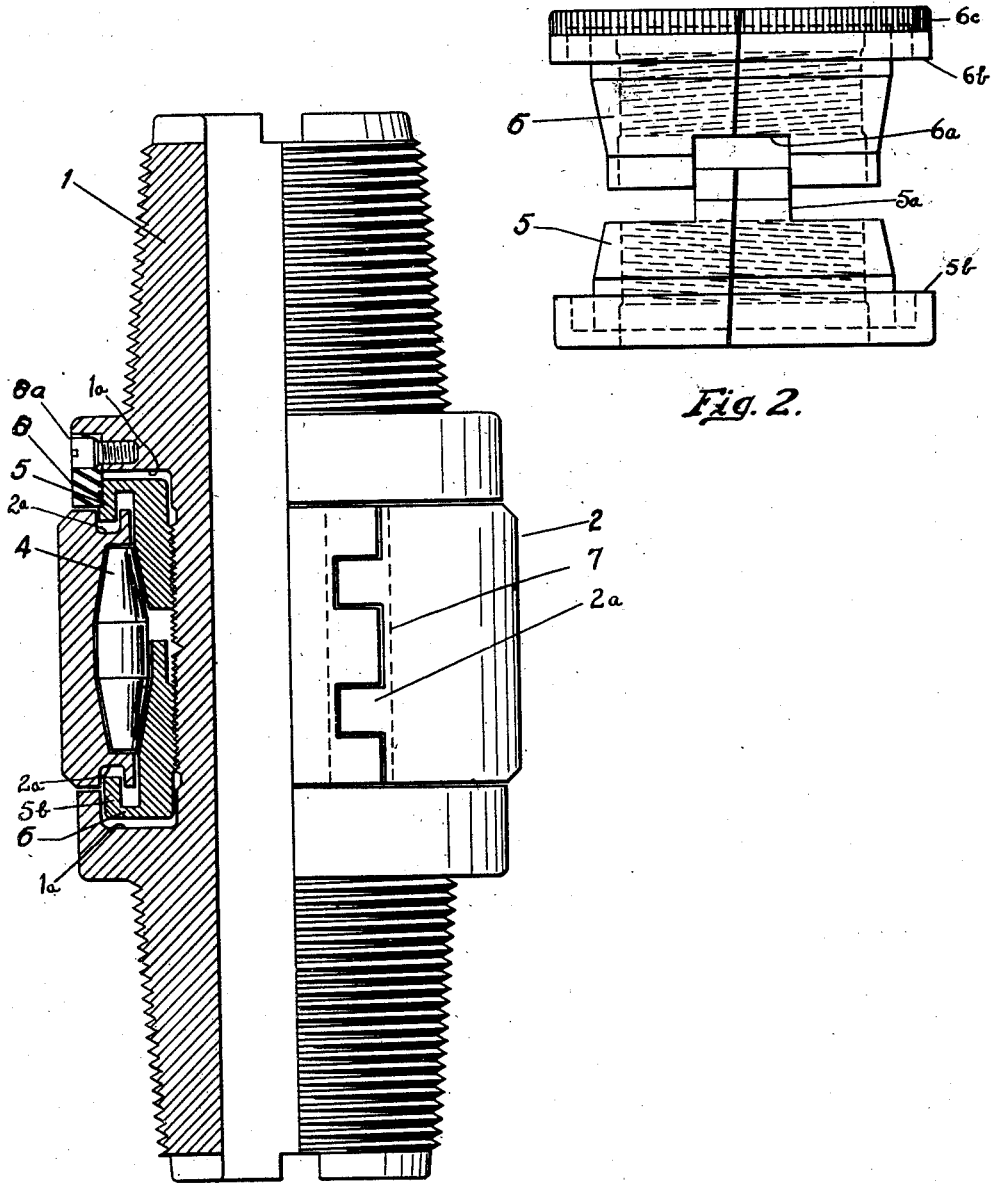

Nov. 17, 1931.   C. H. M. BULL   1,831,999
ANTIFRICTION DEVICE
Filed Dec. 27, 1927

INVENTOR.
CLINTON H. M. BULL
BY
ATTORNEY.

Patented Nov. 17, 1931

1,831,999

UNITED STATES PATENT OFFICE

CLINTON H. M. BULL, OF HOUSTON, TEXAS, ASSIGNOR TO REED ROLLER BIT COMPANY, OF HOUSTON, TEXAS, A CORPORATION OF TEXAS

ANTIFRICTION DEVICE

Application filed December 27, 1927. Serial No. 242,920.

This invention relates to deep well drill stem antifriction devices.

In deep well drilling, a drill stem is ordinarily used embodying a number of sections of pipe joined together by tool joint couplings. The stem invariably moves laterally in the hole, because of bent portions, loose joints, and the like, and such lateral movement is the cause of wear.

This invention has for one of its objects the provision of a new and improved antifriction device to prevent wear of the stem, said device embodying adjustable means to compensate for wear of the parts thereof.

Other objects will hereinafter appear.

In the accompanying drawings, which are illustrative of the preferred embodiment of the invention, Fig. 1 is a partly sectional side elevation of the assembled device; and Fig. 2, a detail view showing the adjustable bushings.

Referring specifically to the drawings, the coupling comprises a body 1 having screw-threaded shanks on both ends thereof adapted to enter the ends of the adjacent pipe sections (not shown). The body has also an intermediate annular recess adapted to receive the bearing elements.

The bearing elements include a diametrically split sleeve 2 having interfitting lugs 2a, diametrically split bushings 5 and 6, and rollers 4.

The split bushings 5 and 6 have internal threads, the threads of the one being right hand and of the other, left hand. These threads are adapted to engage the opposite threads on the innermost wall of the annular recess in the head. A lug 5a on bushing 5 enters the slot 6a in bushing 6 to hold said bushings against rotation with respect to each other, and at the same time permit movement of the one toward or away from the other. The adjacent ends of said bushings are tapered, as shown, to conform to the tapered roller 4; and the remote ends of said bushings have annular flanges 5b and 6b, respectively, adapted to enter the annular grooves 2a in the adjacent ends of sleeve 2. Sleeve 2 is provided with a tapered internal surface conforming to the tapered roller 4.

The parts may be assembled by placing the two sections of the bushing 5 about the body in the recess so that the threads engage, and then screwing the same into the lower pocket 1a. The two sections of the bushing 6 may then likewise be screwed into the upper pocket 1a. It will be understood that the bushings fit snugly in the pockets. A sufficient number of rollers are then placed in the two sections of sleeve 2, and said sections, with the rollers therein, are placed around bushings 5 and 6. The retaining plug 8 having been removed, a suitable tool is inserted through the outer wall of the upper pocket 1a to engage the serrated surface 6c of bushing 6 and so rotate said bushing that it moves downwardly. Bushings 5 and 6 being locked against relative rotation by the lug 5a fitting in slot 6a, and the said bushings being oppositely threaded, as above pointed out, the downward movement of bushing 6 is attended by upward movement of bushing 5. When the bushings are thus moved toward each other, the annular flanges 5b and 6b thereof enter the annular grooves 2a in the ends of sleeve 2, to rotatably lock said sleeve in said recess. The plug 8 may then be replaced, and retaining set screw 8a inserted. The inner surface of said plug is grooved to fit the serrations 6c of bushings 6, so the bushings are thereby locked against rotation.

Should the parts become so worn that objectionable lateral movement of the sleeve 2 occurs, the plug 8 may be removed and a tool applied to the surface 6c to move the bushings 5 and 6 closer together, thus substantially restoring the parts to their original disposition.

A sealing strip 7 may be interposed between the meeting ends of the sections of sleeve 2, the lugs on said ends being grooved for the reception thereof.

Various advantages of the invention other than those hereinabove referred to, will be apparent to those skilled in the art, and it is to be understood that the following claims are not limited to the specific embodiment shown, and that various changes may be made within the scope thereof.

I claim:

1. An anti-friction device having a body with an annular recess therein, the end walls of said recess having annular pockets, a pair of bushings in said recess, the remote ends of said bushings extending into said pockets, a sleeve on said bushings, and rollers between said sleeve and bushings.

2. An anti-friction device having a body with an annular recess, the end walls of said recess having annular pockets therein, a pair of bushings oppositely threaded on said body within said recess and extending into said pockets, a sleeve on said bushings, and rollers between said sleeve and bushings, one of said walls having an opening therein to permit access to one of said bushings.

3. An anti-friction device having a body with an annular recess, the end walls of said recess having annular pockets therein, a pair of bushings oppositely threaded on said body within said recess, and extending into said pockets, a sleeve on said bushings, said sleeve having annular grooves in the ends thereof and said bushings having annular flanges to enter said grooves.

4. An anti-friction device having a body with an annular recess, the end walls of said recess having annular pockets therein, a pair of bushings oppositely threaded on said body within said recess and extending into said annular pockets, a sleeve on said bushings, and rollers between said sleeve and bushings, said sleeve having annular grooves in the ends thereof, and said bushings having annular flanges to enter said grooves.

5. An anti-friction device comprising a body, a pair of tapered bushings oppositely threaded on said body and locked against rotation with respect to each other but movable toward and away from each other, each of said bushings having an annular flange, a sleeve on said bushings, said sleeve having a groove in each end thereof for the reception of one of said flanges, and rollers between said bushings and sleeve.

6. An anti-friction device comprising a body, a pair of tapered bushings oppositely threaded on said body and locked against rotation with respect to each other but movable toward and away from each other, each of said bushings having an annular flange, a sleeve on said bushings, said sleeve having a groove in each end thereof for the reception of one of said flanges, and a tapered internal bearing surface, and rollers between said bushings and sleeve.

7. An anti-friction device having a body, a pair of bushings oppositely threaded on said body, each of said bushings having a tapered end, said ends being adjacent each other, said bushings being locked against rotation with respect to each other, a sleeve on said bushings, and rollers between said sleeve and said ends of said bushings.

In testimony whereof, I hereunto affix my signature.

CLINTON H. M. BULL.